United States Patent [19]

Band et al.

[11] Patent Number: 4,651,426

[45] Date of Patent: Mar. 24, 1987

[54] PORTAL TYPE COORDINATE MEASURING MACHINE

[75] Inventors: Gerhard Band; Gunther Ross, both of Oberndorf, Fed. Rep. of Germany

[73] Assignee: Mauser-Werke Oberndorf GmbH, Fed. Rep. of Germany

[21] Appl. No.: 782,284

[22] Filed: Sep. 30, 1985

[30] Foreign Application Priority Data

Oct. 10, 1984 [DE] Fed. Rep. of Germany ....... 3437094

[51] Int. Cl.$^4$ .................. G01D 15/16; F16H 55/52
[52] U.S. Cl. ............................. 33/1 M; 33/503
[58] Field of Search ............ 33/503, 504, 505, 549, 33/552, 1 M

[56] References Cited

U.S. PATENT DOCUMENTS

| | | | |
|---|---|---|---|
| 2,981,123 | 4/1961 | McHugh | 33/1 M |
| 3,241,243 | 3/1966 | Speer | 33/503 |
| 4,175,327 | 11/1979 | Herzog | 33/503 |
| 4,328,713 | 5/1982 | Lund | 33/1 M |
| 4,333,238 | 6/1982 | McMurtry | 33/503 |
| 4,420,886 | 12/1983 | Amano | 33/1 M |
| 4,524,520 | 6/1985 | Levy | 33/1 M |

FOREIGN PATENT DOCUMENTS 2248194 12/1977 Fed. Rep. of Germany.
3150978 6/1983 Fed. Rep. of Germany.

*Primary Examiner*—Willis Little
*Attorney, Agent, or Firm*—McGlew and Tuttle

[57] ABSTRACT

A portal type coordinate measuring machine includes a column on each side of a measuring table which is movable by a synchronous belt drive connected to each column. A drive motor is centrally mounted on a bridge portion overlying the columns and it drives a horizontal shaft which extends to each column and effects the rotation of a drive pinion which engages a gear belt which extends parallel to each column and is carried by the column. The drive includes a toothed belt or gear belt which is disposed parallel to the guiding ways for the columns and has its ends firmly clamped on the bridge and an active central portion which extends around a drive pinion which is tensioned on respective sides of the drive pinion by tension rolls.

13 Claims, 3 Drawing Figures

PORTAL TYPE COORDINATE MEASURING MACHINE

FIELD AND BACKGROUND OF THE INVENTION

This invention relates in general to measuring devices and in particular to a new and useful portal type coordinate measuring machine.

The invention relates to a portal type coordinate machine in which the columns on both sides of the measuring table are disposed in ways so as to be movable lengthwise and firmly interconnected by a bridge accommodating the measuring head holder, and which, furthermore, has a measuring device each along the ways of both columns to indicate the position of the columns.

A coordinate measuring machine, in particular length measuring machine, of the above mentioned kind is known from German AS No. 22 48 194. This publication describes a solution of the problem when the two vertical columns are to be moved accurately in the associated ways along the measuring table in order to relocate both columns along the travel axis relative to a reference position, maintaining exactly the same distance. In can be learned from this German AS No. 22 48 194 that the above mentioned problem cannot be eliminated completely even when using expensive precision elements, for which reason there are provided, as a solution, on the ways of the columns two measuring devices whose output signals are compensated together with the output signal of a third measuing device. Each column of this known coordinate measuring machine is moved by means of an associated precision screw screwed into a nut with no, or little, friction. The respective nut is provided at the associated column. It is aligned axially with a large diameter hole in the associated column.

This hole is to assure that when the screw is turned, it does not touch the column. Known from German OS No. 31 50 978 is a portal type measuring machine which has a central guide rail. The portal is formed by two columns and the bridge. Installed in the feet of the columns are air bearings, by means of which the portal slides on the base plate. The portal drive is integrated in the housing and has two friction rolls acting upon the guide rail.

SUMMARY OF THE INVENTION

The invention provides a coordinate measuring machine which has a drive system operating smoothly without much noise and backlash at high speeds, with good distribution of the dynamic forces introduced and with little distortion of the ways for increased guiding accuracy.

According to the invention, there is coordinated with each one of the two columns a synchronous belt drive for the lengthwise motion, both in driving connection with a common power source. According to the invention, the toothed belt may be disposed parallel to the ways of the columns, both its ends firmly clamped, and its active central section led in a meandering fashion around a drive pinion while engaging a facing tooth profile of a drive element disposed parallel below the toothed belt. This drive element may be a slightly prestressed toothed belt. It may just as well also be a rack. The toothed belt may be kept in positive engagement with the drive pinion and the drive element by two tension rolls disposed on both sides of the drive pinion with axes of rotation offset slightly below the drive pinion. The common power source may be a drive motor mounted approximately in the center of the bridge and driving a driveshaft running parallel to the bridge and connected to the synchronous belt drives at the columns.

A transmission stage formed by two further toothed belt pulleys may be interposed between the pulley driven by the driveshaft and the drive pinion for the toothed belt. Finally, the toothed belt and the drive element may each be fastened, on the mutually facing insides of the stationary areas of the columns, to holders while the toothed belt drive with the drive pinion is installed in a housing device on the insides of the lengthwise movable areas of the columns.

This coordinate measuring machine according to the invention utilizes in purposeful manner the possibility of realizing, through the symmetrical construction to the left and right of the bridge, a drive system with a toothed belt. To assure measuring accuracy, the double drive employs two length measuring systems which, when the machine is started cold, makes it possible automatically, through reference marks, to identify the angular position in the X-Y plane and to constantly monitor and compensate by computation the angular deviation. The angular deviation caused by the pitch error of the synchronous belt drive can be compensated by computation with the guide error compensation. The measuring machine includes a slightly pre-stressed toothed belt for the rotary and lengthwise, low backlash drive. Furthermore, the load distribution over several teeth is good due to the meandering arrangement of the toothed belt over the drive pinions. There is a positive transmission of the feed forces to a slightly prestressed toothed belt with matching profile, or to a rack. The solution according to the invention is suited for travel axes of any length because the toothed belt wields no influence on the drive stiffness. Furthermore, there is little or no influencing of the guiding accuracy, because the degrees of freedom of the two planes, offset by 90°, are assured. This means that there is rigid transmission in a drive direction, e.g. in the X axis while there is elastic compensation of the toothed belt in each of the two other coordinate directions Y and X.

The symmetrical introduction of forces leads to improved acceleration or deceleration and to an improvement of the dynamic behavior of the bridge. Overall, great stiffness and at the same time good damping behavior are achieved by the design according to the invention.

Accordingly it is an object of the invention to provide a portal type coordinate measuring machine which includes a central bridge portion with a column running in ways on each side of the bridge portion which is driven by a synchronous drive including a drive motor carried by the bridge portion so that the columns on each side of the measuring table are moved in corresponding amounts.

A further object of the invention is to provide a portal type coordinate measuring machine which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
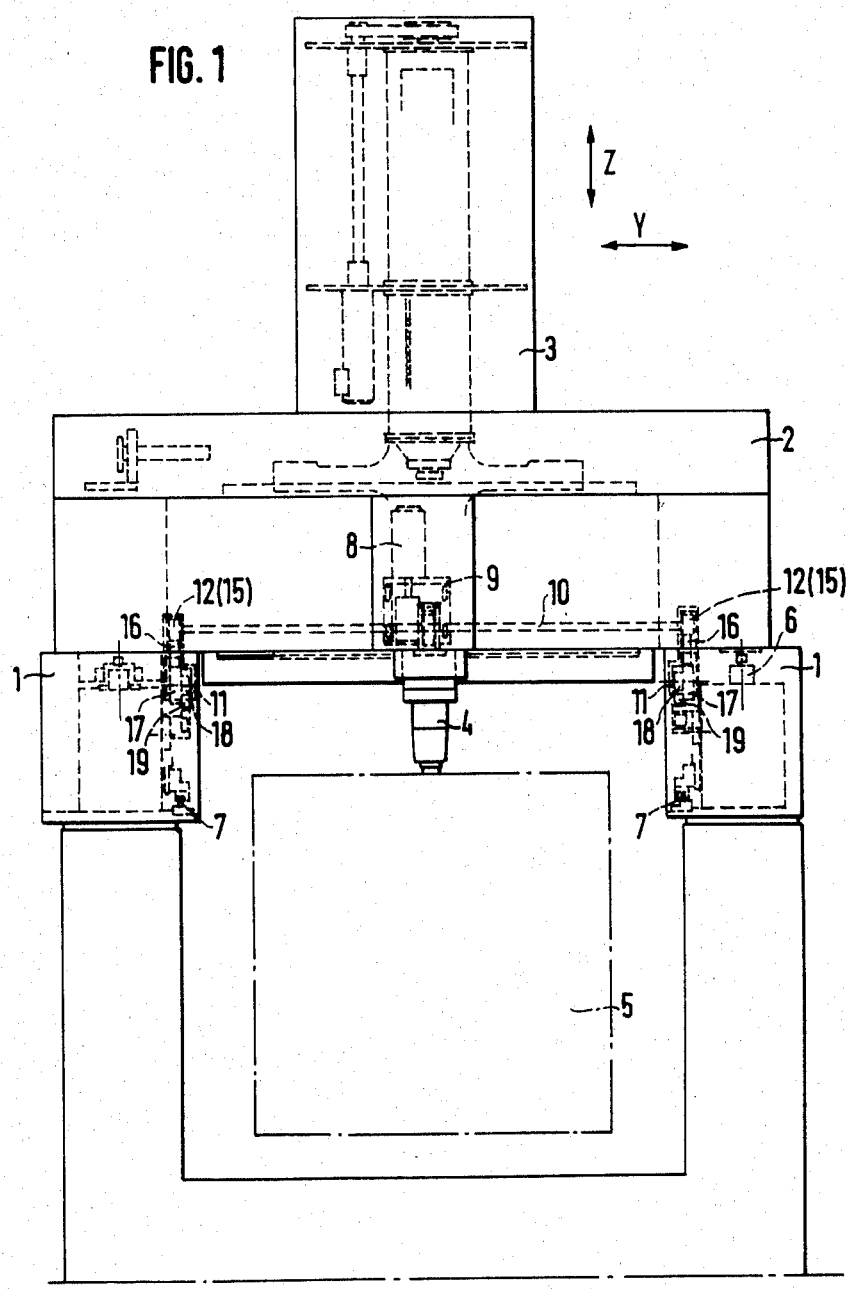
FIG. 1 is an elevational view of a portal type coordinate measuring machine as seen in Y and Z direction.
Figure 2:
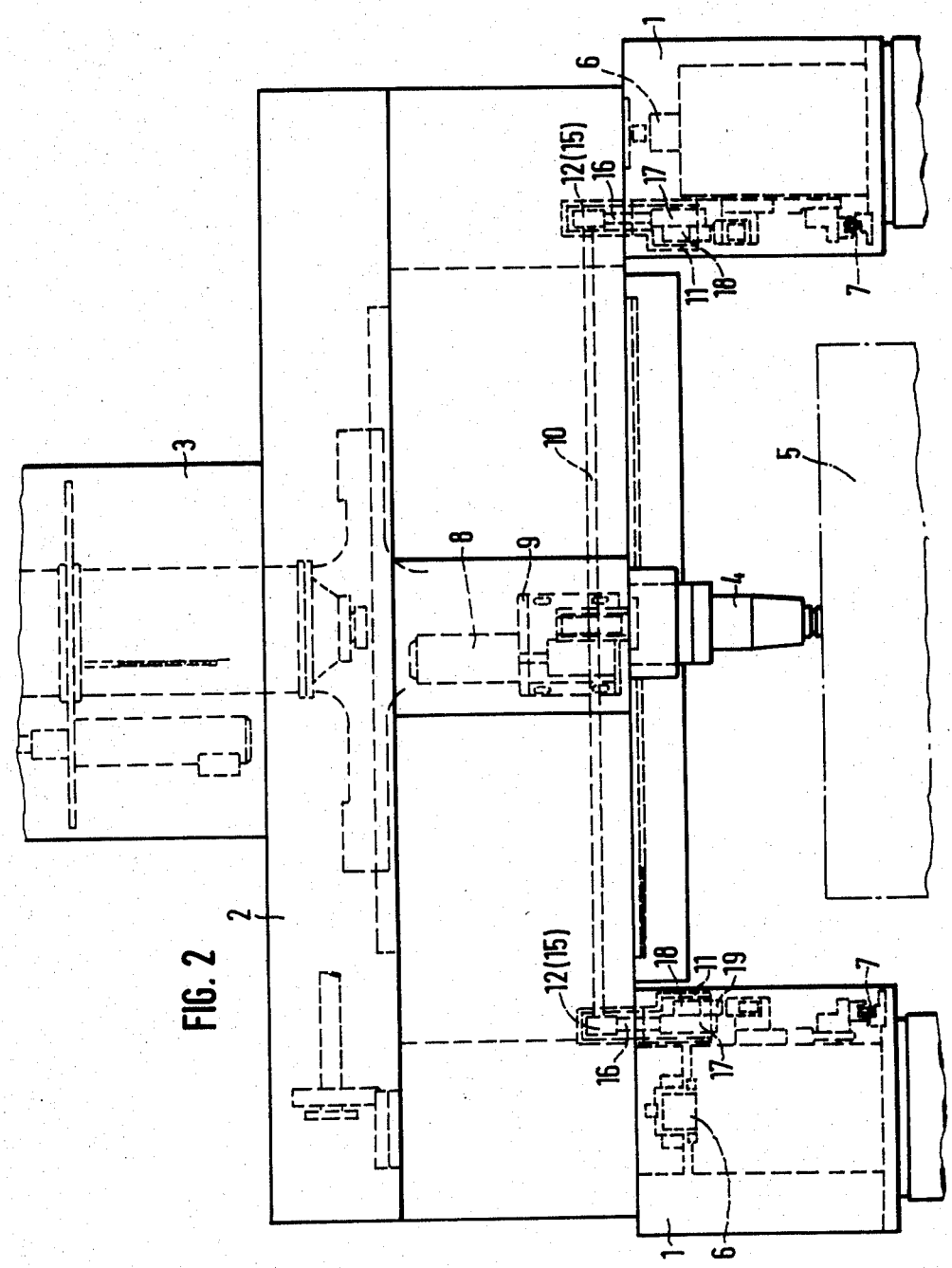
FIG. 2 is an enlarged detail of the coordinate measuring machine according to FIG. 1 with the drive of the two columns.

Referring to the drawings in particular the invention embodied therein comprises a portal type measuring machine which comprises a measuring table 5 which extends below a bridge 2 which is connected at each side to a column in a manner such that the column is guided on ways 6 for longitudinal movement. The columns, 1,1 on each side of the measuring table 5 locate a measuring head 4 and the relative position of the columns is measured by a measuring device 7. In accordance with the invention a synchronous belt drive is mounted on the bridge 2 and is coordinated with each of the columns, 1,1. The drive includes a drive motor 8 which is mounted on a support 9 which provides a synchronous drive through a horizontally extending drive shaft 10 to each column 1,1.

Figure 3:
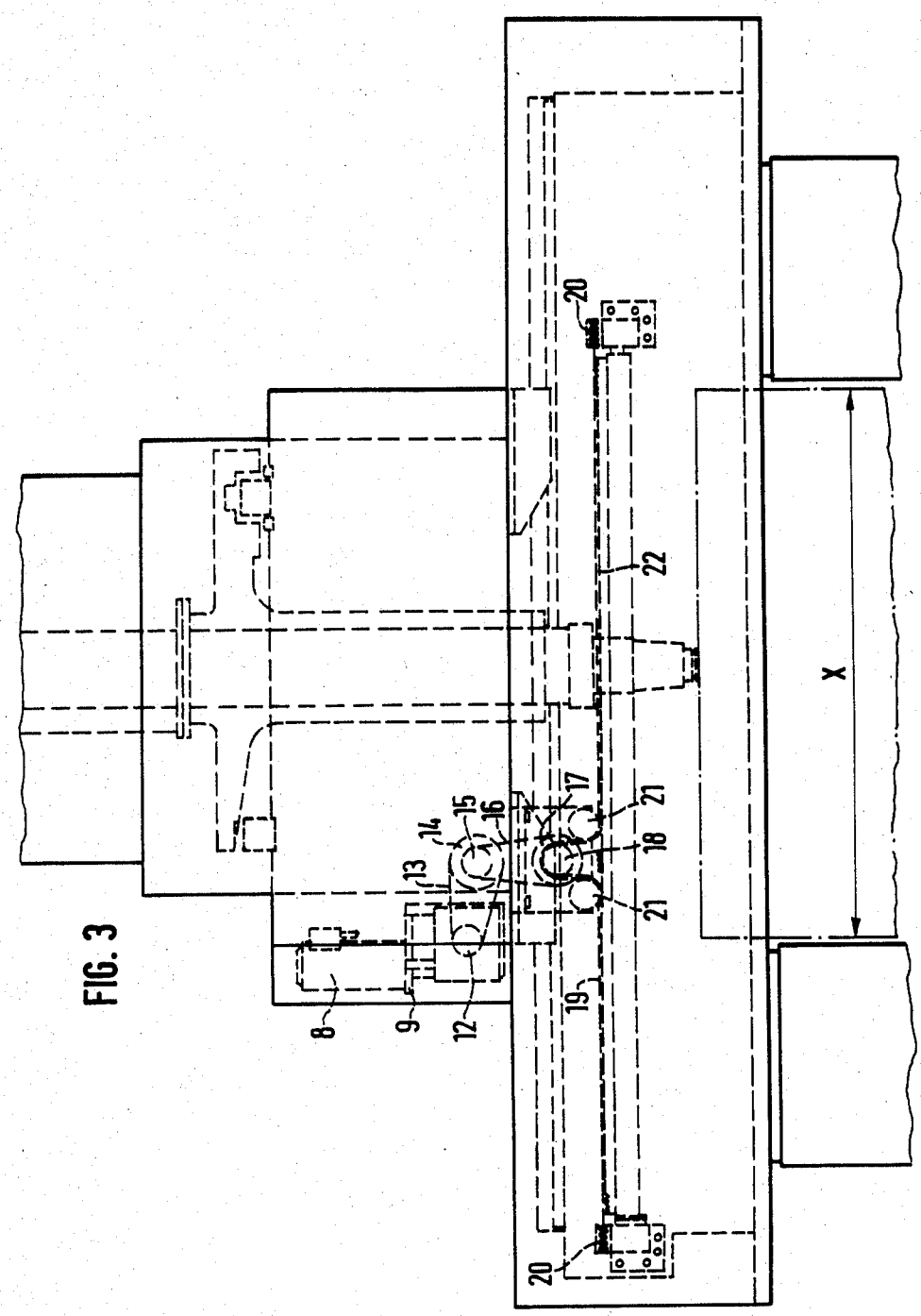
FIG. 3 is an enlarged detail of the coordinate measuring machine with the drive as seen in X direction.

The portal type coordinate measuring machine is composed essentially of two spaced apart columns 1,1, a bridge 2, a holder 3 for a measuring head 4 and a measuring table 5. The bridge 2 is rigidly connected to the two columns 1 which are movable lengthwise in ways 6 on both sides of the measuring table 5. Associated with each column 1, as a length scale, is a measuring device 7 with which a position display of the column is obtained. Mounted approximately in the center of the bridge between the two columns is a drive motor 8 in a support 9, driving a drive shaft 10 extending on both sides of the drive motor parallel to the bridge up to the individual column drives. To accommodate the drives for the columns 1, 1, housing devices 11 are provided at each of their mutually facing insides. The drive shaft 10 is connected to a drive pulley 12 each of which, via a gear belt or a toothed belt 13, drives an idler wheel 14 which drives another idler wheel 15 on the same shaft. This idler wheel 15, finally, drives, via a gear belt or toothed belt 16, a toothed belt pulley 17 which turns the drive pinion 18 fixed to the same shaft. A toothed belt 19, disposed parallel to the ways 6 of the columns 1 and both of its ends 20 firmly clamped in a holding device of the coordinate measuring machine meanders across the drive pinion 18 in its central portion. Two tension rolls 21 disposed laterally of the drive pinion 18 below the axis of rotation of the pinion 18 assure positive engagement of the toothed belt 19 with the drive pinion 18 and with the matching profile of a drive element 22 disposed below the toothed belt 19. This drive element may also be a toothed belt, but according to FIG. 3 this drive element 22 is designed as rack with a tooth profile.

While a specific embodiment of the invention has been shown and described in detail to illustrate the application of the principles of the invention, it will be understood that the invention may be embodied otherwise without departing from such principles.

What is claimed is:

1. Portal type coordinate measuring machine, comprising a measuring table, a column on each side of said table, a bridge extending between and interconnected to said columns to form a moveable portable member, support means having guideways for the movement of said columns in lengthwise direction, a measuring head holder carried by said bridge, a position measuring device disposed along the guideways of both columns to indicate the position of said columns, and a synchronous belt drive coordinated with each of said columns for effecting the lengthwise movement thereof including belt means stationarily disposed on the support means parallel to the guideways and drive means disposed on the moveable portal member and operatively engaged with the belt means for movement of said columns in lengthwise direction along the belt means.

2. Machine of claim 1 wherein a power motor is mounted on said bridge and connected to said drive means.

3. Machine of claim 2 wherein each said synchronous belt drive includes a toothed belt secured at each end to the support means and having an active central belt portion, a drive pinion on each said column and engaged with each said active central belt portion, said central belt portion being lead in a meandering fashion around said drive pinion, and a drive element disposed beneath each toothed belt and engaged therewith.

4. Machine of claim 3 wherein said drive element comprises a slightly prestressed matching toothed belt.

5. Machine of claim 3 wherein said drive element comprises a matching rack.

6. Machine of claim 3 including a tension roll engaged with each said belt on each side of said drive pinion engaged with said belt and having axes of rotation offset slightly below said drive pinion.

7. Machine of claim 3 wherein said motor is a common drive motor mounted adjacent the center of said bridge and connected to a drive shaft extending parallel to said bridge and having a drive pulley and a gear belt drive transmission means for driving each said drive pinion.

8. Machine of claim 7 wherein at least two further toothed belt pulleys are interposed in each said gear belt drive transmission means between the corresponding drive pulley and drive pinion.

9. Machine of claim 3 wherein each said toothed belt and drive element are mounted on a holding device on said support means at an inwardly facing portion of each said column, and each said drive pinion is correspondingly mounted in a housing device on the inside of each said column and in engagement with the toothed belt thereat.

10. Portal type coordinate measuring machine, comprising a measuring table, support means having a pair of parallel longitudinal guideways one on each side of the table, a moveable portal member including a pair of columns mounted for movement on the guideways and a bridge extending between and transversely interconnecting the columns, a measuring head holder carried by the bridge above the table, position measuring means disposed along the guideways to indicate the position of the columns, and a synchronous belt drive coordinated with each column for effecting movement thereof along the guideways, including a toothed belt stationarily disposed on the support means parallel to the guideway at each side of the table and secured at each end to the support means and having an active central belt portion, a drive pinion on each column and engaged with the active central belt portion of the corresponding belt, said central belt portion being led in a meandering fashion around said drive pinion for movement of the columns on the guideways in longitudinal direction along the belts, a matching toothed drive element disposed beneath the toothed belt and engaged therewith, and drive transmission means on the portal member and connected for driving the drive pinions.

11. Machine of claim 10 wherein a drive motor is mounted on the bridge and connected to a common drive shaft extending parallel to the bridge, and the drive shaft is connected by drive pulleys and gear belt drive transmission means for driving the drive pinions.

12. Machine of claim 10 including a tension roll engaged with the active belt portion of each belt on each side of the corresponding drive pinion and having axes of rotation offset slightly below said drive pinion.

13. Portal type coordinate drive system comprising support means having a pair of parallel longitudinal guideways defining a transverse space therebetween, a moveable portal member including a pair of columns mounted for longitudinal movement along the guideways and a bridge transversely interconnecting the columns, a stationarily disposed toothed belt parallel to and adjacent each guideway and secured at its ends to the support means and having an active central belt portion, a matching toothed drive element stationarily disposed beneath each toothed belt and engaged therewith, a drive pinion on each column and engaged with the active central portion of the corresponding toothed belt, each said central belt portion being led in a meandering fashion around the drive pinion thereat for movement of the columns on the guideways in longitudinal direction along the belts, and drive means on the portal member for synchronous coordinated driving of the drive pinions.

* * * * *